Patented Oct. 19, 1954

2,692,270

UNITED STATES PATENT OFFICE 2,692,270

PREPARATION OF ARYLALIPHATIC DI-CARBOXYLIC ACIDS AND DERIVATIVES THEREOF

Ellington M. Beavers, Philadelphia, Pa., assignor to Rohm & Haas Company, Philadelphia, Pa., a corporation of Delaware No Drawing. Application December 16, 1948,
Serial No. 65,714

5 Claims. (Cl. 260—346.8)

This invention relates to a process of preparing anhydrides of arylaliphatic dicarboxylic acids. More particularly, it relates to a process of preparing said compounds which comprises reacting, under the influence of heat and in the presence of an organic peroxidic catalyst, an alkyl-substituted aromatic hydrocarbon which has an active alpha hydrogen atom in the alkyl substituent of said hydrocarbon and maleic anhydride.

The course which the reaction is believed to follow is illustrated by the following equation

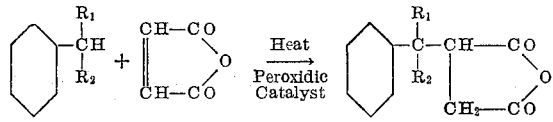

in which $R_1$ is either hydrogen or an alkyl group and $R_2$ is an alkyl group. The fact that alkyl-substituted aromatic hydrocarbons and, for example, maleic anhydride react to form compounds like that shown above is known. Heretofore, however, the reaction was invariably conducted under extremely high pressures and in the absence of a peroxidic catalyst. This invention resides in the surprising discovery that the reaction can be carried out under normal pressure when it is catalyzed by an organic peroxidic compound or agent. Now, according to the process of this invention, anhydrides of arylaliphatic dicarboxylic acids can be readily and safely manufactured on a commercial scale for many purposes such as the production of synthetic resins and plasticizers.

While the number of the products of this invention is relatively large, the products themselves are all of one general type. This springs from the fact that the composition or chemical structure of the reactants which are operable is critical.

Thus, the aromatic hydrocarbon must contain an alkyl substituent. This alkyl substituent, in turn, must contain an active hydrogen atom which is in the alpha position relative to the aromatic ring. That is, the alkyl substituent must contain a hydrogen atom on the carbon atom which is directly attached to the ring. This requirement rules out those aromatic hydrocarbons in which the sole alkyl substituent is a tertiary alkyl group. It does not, however, exclude polysubstituted alkyl aromatic hydrocarbons wherein one alkyl substituent is a tertiary alkyl group and another is a primary or secondary alkyl group containing the necessary alpha hydrogen atom. Furthermore, the number of carbon atoms in the alkyl substituents must total at least two. Thus, toluene, which has not been found to be operable despite its having alpha hydrogen atoms, is excluded while m-xylene and p-xylene, each of which has two methyl groups on the benzene ring, can be reacted by the process of this invention. On the other hand, o-xylene reacts only sparingly and for this reason it is recommended that the aromatic hydrocarbon have at least one alkyl substituent which contains at least two carbon atoms, as in the ethyl group. The following alkyl-substituted hydrocarbons, which can be reacted by the process of this invention, are listed by way of example: ethylbenzene; isopropylbenzene; p-cymene; mesitylene; 1,2,4,5-tetramethylbenzene; 1,3,5-triisopropylbenzene; sec.-butylbenzene; n-propylbenzene; o-, m-, and p-diethylbenzenes; n- and sec.-hexylbenzenes; n-dodecylbenzene and its isomers excluding the tertiary isomers; n-octadecylbenzene and its secondary isomers. Styrene, which is not an alkyl-substituted aromatic hydrocarbon due to its unsaturation, is of course excluded. The size and configuration of the alkyl substituent is important. The substituent must, as stated above, have an alpha hydrogen atom. Hydrocarbons containing larger substituent groups react more readily than those having smaller substituents and substituted benzenes containing as many as 18 carbon atoms in the alkyl substituent have been successfully reacted with maleic anhydrides to form the corresponding addition products. It should also be noted that polyalkylbenzenes react in the process of this invention and that in general, if the groups vary in size, the point of reaction is on the alpha carbon atom of the larger substituent. When maleic anhydride reacts with a polyalkylated benzene, the reaction apparently stops when one mole of each has reacted.

While this process is particularly suitable for the reaction of alkylbenzenes, it has also been applied to the reaction of alkylbenzenes containing other substituents such as chlorine, nitro, cyano, keto-, and ether groups. These substituents exert a retarding action and the yields of the products are ordinarily much lower for a given reaction time than those obtained from non-substituted hydrocarbons such as those discussed above.

The reaction shown above is carried out at temperatures from 80° to 155° C. and preferably from 80° to 120° C. The optimal temperature will vary between these limits depending on the particular reactants and peroxidic agent. Temperatures as high as 200° C. have been employed but are not recommended because the most common peroxidic agents are destroyed rapidly and wastefully under such conditions. Temperatures above 200° C. may even be used, however, if the economics are not considered. In a similar manner, superatmospheric pressure may be used, but there is no apparent advantage in doing so. The process of this invention represents an improvement over prior processes for the very fact that very high temperatures and pressures need not be employed and that excellent yields of the desired products are obtained rapidly under conditions which are convenient and economical and which give rise to a minimum of resinous by-products.

The organic peroxidic catalysts which are used are well-known as those which give rise to the formation of free radicals. They are those which are used commonly to accelerate the polymerization of ethenoid materials such as methyl methacrylate, vinyl chloride, diallyl esters and the like. Typical peroxidic agents include acetyl peroxide, lauryl peroxide, stearyl peroxide, benzoyl peroxide, acetone peroxide, tert.-butyl hydroperoxide, di-tert.-butylperoxide, di-tert.-butyl diperphthalate, tert.-butyl perbenzoate, cumene hydroperoxide, hydroxy cyclohexyl hydroperoxide and the like.

The amount of peroxidic catalyst which is used depends on the choice of reactants, the size of the batch, the temperature, and similar factors. As much as 25 mole-percent based on the maleic anhydride results in violent reactions and accordingly a maximum amount of 10 mole-percent is recommended. In most cases a ratio of 1 to 3 mole-percent is employed because such a ratio assures a satisfactory rate of reaction without giving rise to the formation of by-products.

It is evident from the typical reaction shown above that the hydrocarbon and the maleic anhydride react in equimolecular proportions. While either reactant, however, may be present in excess, it is much preferred to employ an excess of the hydrocarbon since the latter serves as both reactant and solvent, and thereby provides a means of controlling the rate of reaction. Ratios of the two kinds of reactants which have been used successfully range from two moles of maleic anhydride to one of the hydrocarbon up to 28 moles of the hydrocarbon to one mole of the maleic anhydride. The products are readily separated from the excess of either reactant by conventional means such as precipitation, extraction, or distillation.

The following example serves to illustrate how the process of this invention is carried out:

Four moles of isopropylbenzene and one mole of maleic anhydride were placed in a three-neck balloon flask equipped with mechanical agitator, thermometer, reflux condenser, and dropping funnel. The mixture was heated to 150° C. and maintained at this point while 0.03 mole of benzoyl peroxide dissolved in one mole of isopropylbenzene was added dropwise over a period of two hours. After the addition of the peroxide the reaction mixture was heated for an additional thirty minutes at 150° C. after which it was cooled and transferred to a steam-heated vacuum-dish. The excess of isopropylbenzene was stripped off under a pressure of 10–30 mm. The residue was then purified by vacuum-distillation. The product was a viscous liquid which boiled at 158°–159° C. under a pressure of 0.9 mm. Its molecular weight, determined by its elevation of the boiling point of acetone, was 211 as against the calculated molecular weight of 218 for the compound having the formula

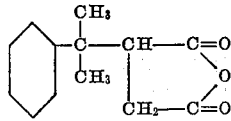

Analysis showed it to have a carbon-content of 71.52% (calculated—71.56%) and a hydrogen-content of 6.49% (calculated—6.47%).

In a similar manner other aryl hydrocarbons and unsaturated acid derivatives were reacted. Thus, for example, ethylbenzene, 1,3-dimethylbenzene (m-xylene), 1,3,5-trimethylbenzene (mesitylene), and a technical grade of 1,3,5-triisopropylbenzene were respectively reacted with maleic anhydride by the process described above. The products were identified respectively as having the following formulas:

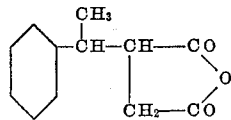

from ethyl benzene. (Analysis: C=69.96%; $H_2$=5.88%; $O_2$=24.16%; mol. wt.=204. Calculated values: C=70.6%; $H_2$=5.88%; $O_2$=23.52%; mol. wt.=204.)

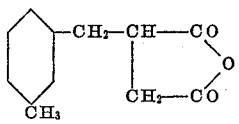

from m-xylene. (Analysis: C=71.16%; $H_2$=5.57%; $O_2$=23.27%; mol. wt.=202. Calculated values: C=70.60%; $H_2$=5.88%; $O_2$=23.52%; mol. wt.=204.)

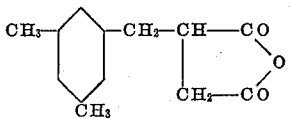

from mesitylene. (Analysis: C=71.02%; $H_2$=6.45%; $O_2$=22.53%; mol. wt.=219. Calculated values: C=71.60%; $H_2$=6.42%; $O_2$=21.98%; mol. wt.=218.)

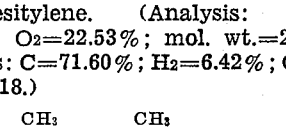

from 1,3,5-triisopropylbenzene. (Analysis: C=74.91%; $H_2$=8.16%; $O_2$=16.93%; mol. wt.=296. Calculated values: C=75.50%; $H_2$=8.61%; $O_2$=15.89%; mol. wt.=302.)

I claim:

1. A process for preparing anhydrides of arylaliphatic dicarboxylic acids which comprises reacting a mixture which consists of (a) an alkyl-substituted, monocyclic, aromatic hydrocarbon having an alkyl substituent which in turn contains an active alpha hydrogen atom and also contains 2 to 18 carbon atoms, and (b) maleic anhydride, at a temperature of 80° C. to 155° C. in the presence of an organic, peroxidic catalyst, said catalyst being present in an amount equal to one to ten mole-percent based on said maleic anhydride.

2. A process for preparing anhydrides of arylaliphatic dicarboxylic acids which comprises reacting a mixture which consists of (a) an alkyl-substituted, monocyclic, aromatic hydrocarbon having an alkyl substituent which in turn contains an active alpha hydrogen atom and also contains 2 to 18 carbon atoms, and (b) maleic anhydride, at a temperature of 80° C. to 120° C. in the presence of an organic, peroxidic catalyst, said catalyst being present in an amount equal to one to three mole-percent based on said maleic anhydride.

3. A process for preparing a compound having the formula:

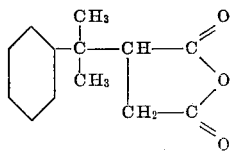

which comprises reacting a mixture consisting of maleic anhydride and isopropyl benzene at a temperature of 80° C. to 155° C. in the presence of an organic, peroxidic catalyst, said catalyst being present in an amount equal to one to three mole-percent based on said maleic anhydride.

4. A process for preparing a compound having the formula

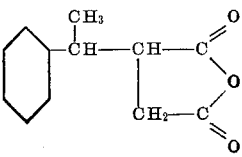

which comprises reacting a mixture consisting of maleic anhydride and ethyl benzene at a temperature of 80° C. to 155° C. in the presence of an organic, peroxidic catalyst, said catalyst being present in an amount equal to one to three mole-percent based on said maleic anhydride.

5. A process for preparing a compound having the formula

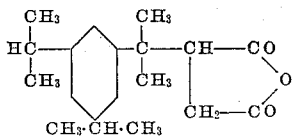

which comprises reacting a mixture consisting of maleic anhydride and 1,3,5-triisopropylbenzene at a temperature of 80° C. to 155° C. in the presence of an organic, peroxidic catalyst, said catalyst being present in an amount equal to 1 to 3 mole-percent based on said maleic anhydride.

References Cited in the file of this patent

UNITED STATES PATENTS

| Number | Name | Date |
| --- | --- | --- |
| 2,121,183 | Binapfl | June 21, 1938 |
| 2,286,062 | Condo | June 9, 1942 |
| 2,378,629 | Hanford | June 19, 1945 |
| 2,383,399 | Lundquist | Aug. 21, 1945 |
| 2,384,085 | Gerhart | Sept. 4, 1945 |